US010108655B2

(12) United States Patent
Dubost et al.

(10) Patent No.: US 10,108,655 B2
(45) Date of Patent: Oct. 23, 2018

(54) INTERACTIVE LOG FILE VISUALIZATION TOOL

(71) Applicant: CA, Inc., New York, NY (US)

(72) Inventors: Philippe Dubost, Prague (CZ); Jan Marek, Strancice (CZ)

(73) Assignee: CA, Inc., New York, NY (US)

(*) Notice: Subject to any disclaimer, the term of this patent is extended or adjusted under 35 U.S.C. 154(b) by 503 days.

(21) Appl. No.: 14/715,725

(22) Filed: May 19, 2015

(65) Prior Publication Data
US 2016/0342656 A1    Nov. 24, 2016

(51) Int. Cl.
*G06F 17/30* (2006.01)
*G06F 11/14* (2006.01)

(52) U.S. Cl.
CPC ........ *G06F 17/30368* (2013.01); *G06F 11/14* (2013.01)

(58) Field of Classification Search
CPC .......................... G06F 17/30368; G06F 11/14
See application file for complete search history.

(56) References Cited

U.S. PATENT DOCUMENTS

| 9,734,021 B1* | 8/2017 | Sanocki | G06F 11/1469 |
| 2003/0158944 A1* | 8/2003 | Branson | G06Q 30/06 709/227 |
| 2007/0233699 A1* | 10/2007 | Taniguchi | G06F 17/30575 |
| 2008/0228833 A1* | 9/2008 | Kano | G06F 11/1469 |
| 2011/0270705 A1* | 11/2011 | Parker | G06F 17/30241 705/26.61 |
| 2012/0173490 A1* | 7/2012 | Gould | G06F 11/1474 707/648 |
| 2013/0036106 A1* | 2/2013 | Lucas | G06F 17/30283 707/703 |

OTHER PUBLICATIONS

TX2014 SR1 Release Documentation, TimeXtender Software, Sep. 4, 2014.*
AppDynamics, Application Intelligence Platform, AppDynamics Pro Documentation, Version 3.9.4, Oct. 16, 2014. (Year: 2014).*

* cited by examiner

*Primary Examiner* — Jay A Morrison
(74) *Attorney, Agent, or Firm* — Meyertons, Hoods, Kivlin, Kowert & Goetzel, P.C.

(57) ABSTRACT

A computing device analyzes the transaction entries of a recovery log, generates graphical representations of the analysis, and displays the graphical representations in an interactive visual display for a user. The analysis is conducted over a predetermined time period, as defined by a user, and in light of user-defined filter information. The graphs are also categorized into respective groups that are defined by the user. Selecting a point along one of the graphs identifies the commands and objects that were involved in executing those commands.

20 Claims, 11 Drawing Sheets

| TIMESTAMP (RBA) | UR | PLAN | PACKAGE | USER ID | OBJECT | SQL DETAILS |
|---|---|---|---|---|---|---|
| 2014-12-10-07.30.09.572084 | 1 | HKEEP01 | HKEEPPKG | RAHR001 | ACCOUNTS | DELETE |
| 2014-12-10-07.30.09.572085 | 2 | VPPLAN | DOUPD | QAUSR99 | ORDERS | INSERT |
| 2014-12-10-07.30.09.572090 | 1 | HKEEP01 | HKEEPPKG | RAHR001 | ACCOUNTS | DELETE |
| 2014-12-10-07.30.09.572132 | 1 | HKEEP01 | HKEEPPKG | RAHR001 | ACCOUNTS | DELETE |
| 2014-12-10-07.30.09.572135 | 1 | HKEEP01 | HKEEPPKG | RAHR001 | ACCOUNTS | DELETE |
| 2014-12-10-07.30.09.572136 | 2 | VPPLAN | DOUPD | QAUSR99 | GOODS | UPDATE |
| 2014-12-10-07.30.09.573114 | 3 | ACCUPD | ACCPKG1 | RAHR001 | ACCOUNTS | INSERT |
| 2014-12-10-07.30.09.574354 | 3 | ACCUPD | ACCPKG2 | RAHR001 | ACCOUNTS | INSERT |
| 2014-12-10-07.30.09.574001 | 1 | HKEEP01 | HKEEPPKG | RAHR001 | ACCOUNTS | DELETE |
| 2014-12-10-07.30.09.574152 | 3 | ACCUPD | ACCPKG1 | RAHR001 | ACCOUNTS | INSERT |
| 2014-12-10-07.30.09.575238 | 3 | ACCUPD | ACCPKG2 | RAHR001 | ACCOUNTS | INSERT |
| 2014-12-10-07.30.09.575184 | 2 | VPPLAN | CLNUP | QAUSR99 | ACCOUNTS | UPDATE |
| 2014-12-10-07.30.09.575233 | 2 | VPPLAN | CLNUP | QAUSR99 | GOODS | UPDATE |

FIG. 2
(PRIOR ART)

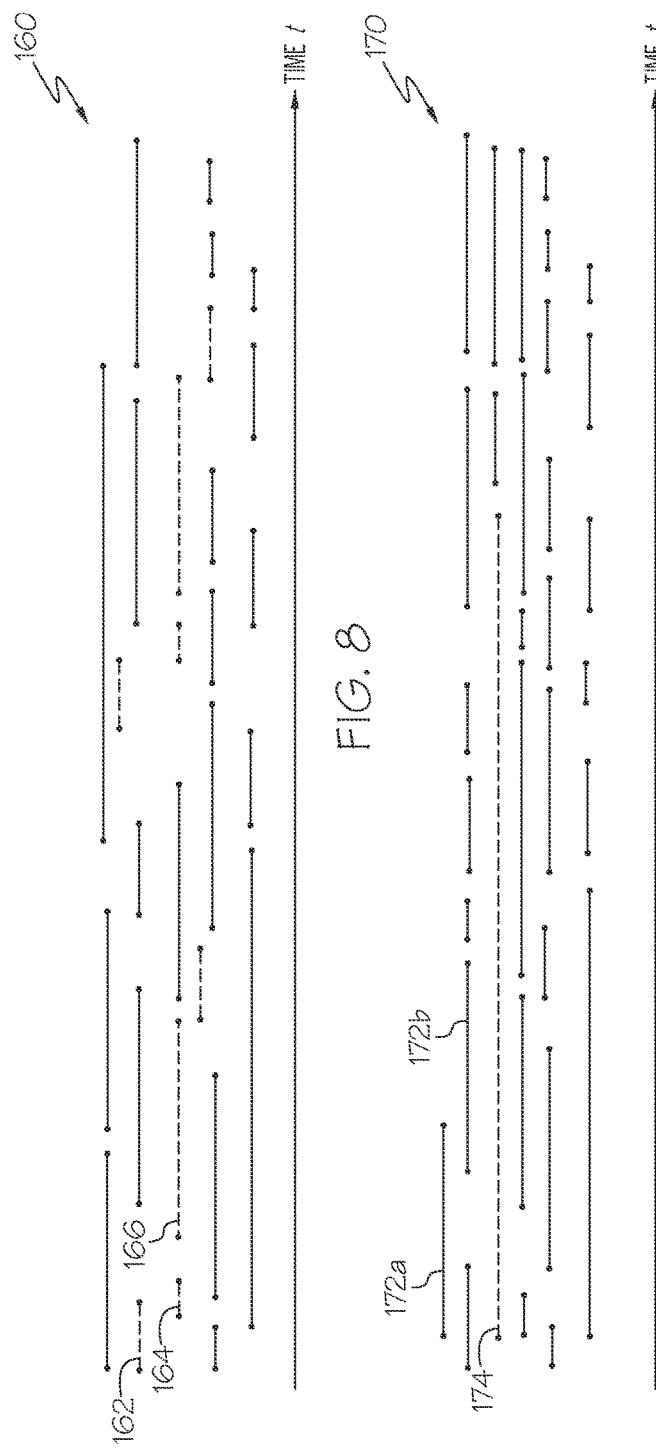
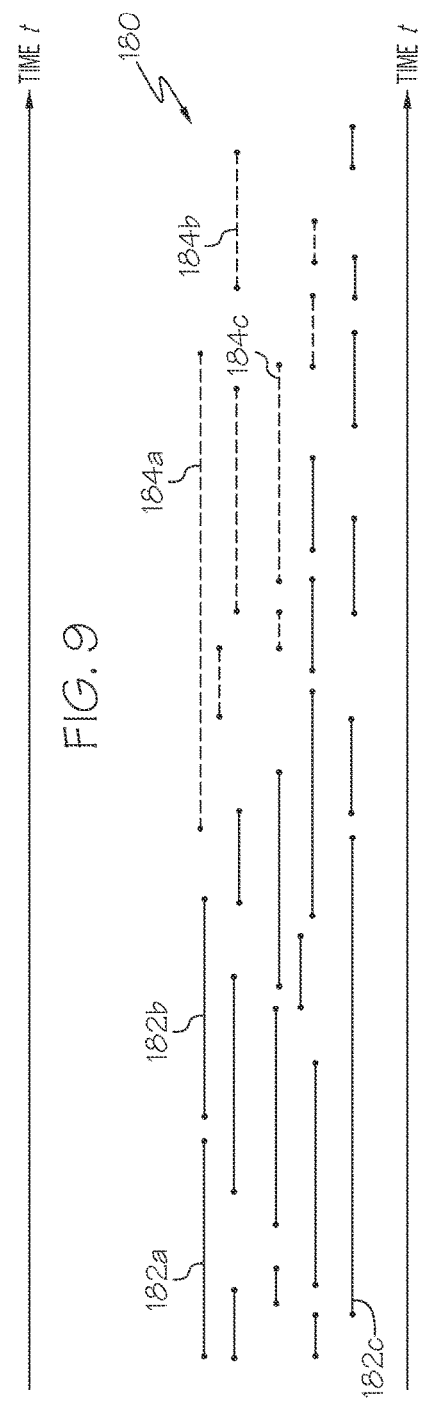
FIG. 8
FIG. 9
FIG. 10

INTERACTIVE LOG FILE VISUALIZATION TOOL

BACKGROUND

The present disclosure relates generally to methods for analyzing database log files, and more particularly, to computing devices configured to generate interactive visual representations of the analysis for display to a user.

There are many different types of application programs that produce log files as part of their normal operating process. For example, many transactional database programs, such as DB2, ORACLE, and the like, produce and maintain a recovery log that contains a variety of information. Such information may include, but is not limited to, Units of Recovery (UR), various commands (e.g., SQL commands) and their associated data, and timestamp information for each command indicating a date and time that the command was executed by a computing device. Other information may also be written to the recovery log as needed or desired; however, regardless of the type of information stored, it is generally utilized to aid in disaster recovery operations.

Conventionally, recovery logs are created, written, and maintained by a database based on commands executed by one or more application programs. The recovery logs may be text-based files or binary files. In either case, there are tools that exist to display the information in the recovery log on a display screen. Typically, the log information is displayed to the user as text in a tabular format; however, even when displayed in this format, the sheer volume of information displayed in this format makes it notoriously difficult for users to analyze and glean any meaningful information.

BRIEF SUMMARY

The present disclosure provides a computing device, a computer-readable storage medium, and a corresponding computer-implemented method for analyzing the content of recovery logs that are generated and maintained by a database, for example, and for graphically representing the results of that analysis in an interactive visual display for a user. The graphical representation facilitates the user's ability to intuitively visualize and understand the analysis, such that the user is better able to identify and focus on a particular aspect of the execution of the database and/or one or more application programs that interact with the database to store and retrieve data. Additionally, because the graphical representations displayed are interactive, the user is more easily able to identify the particular details of a given graphical representation. This further enhances the user's ability to visualize and understand the execution of the database and/or the application programs that interact with the database.

In one embodiment, a computer-implemented method comprises retrieving a database recovery log comprising a plurality of transaction entries from a memory circuit. Each transaction entry is associated with a Unit of Recovery (UR) and comprises information used in database recovery operations. The method also comprises generating, from the plurality of transaction entries, a graphical representation of a plurality of URs, wherein each UR corresponds to a set of related database commands and is graphically represented by a line segment that is linked to the set of related database commands. The method further comprises outputting the graphical representation of the plurality of URs to a first graph section of a Graphical User Interface (GUI) displayed on a display device.

In another embodiment, a computing device comprises a display device configured to display a Graphical User Interface (GUI) to a user and a processing circuit. The processing circuit is configured to retrieve a database recovery log comprising a plurality of transaction entries from a memory circuit. Each transaction entry is associated with a Unit of Recovery (UR) and comprises information used in database recovery operations. The processing circuit is also configured to generate, from the plurality of transaction entries, a graphical representation of a plurality of URs. Each UR corresponds to a set of related database commands and is graphically represented by a line segment that is linked to the set of related database commands. The processing circuit is further configured to output the graphical representation of the plurality of URs to a first graph section of the GUI displayed on the display device.

In another embodiment, a computer-readable storage medium comprises computer program code stored thereon that, when executed by a processing circuit of a computing device, configures the processing circuit to retrieve a database recovery log comprising a plurality of transaction entries from a memory circuit. Each transaction entry is associated with a Unit of Recovery (UR) and comprises information used in database recovery operations. The computer program code also configures the processing circuit to generate, from the plurality of transaction entries, a graphical representation of a plurality of URs, wherein each UR corresponds to a set of related database commands and is graphically represented by a line segment that is linked to the set of related database commands. The computer program code also configures the processing circuit to output the graphical representation of the plurality of URs to a first graph section of a Graphical User Interface (GUI) displayed on a display device.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

FIG. 2 illustrates recovery log information displayed in tabular format.

FIGS. 5-10 illustrate exemplary graphs generated by embodiments of the present disclosure for display on the GUI.

DETAILED DESCRIPTION

Figure 1:
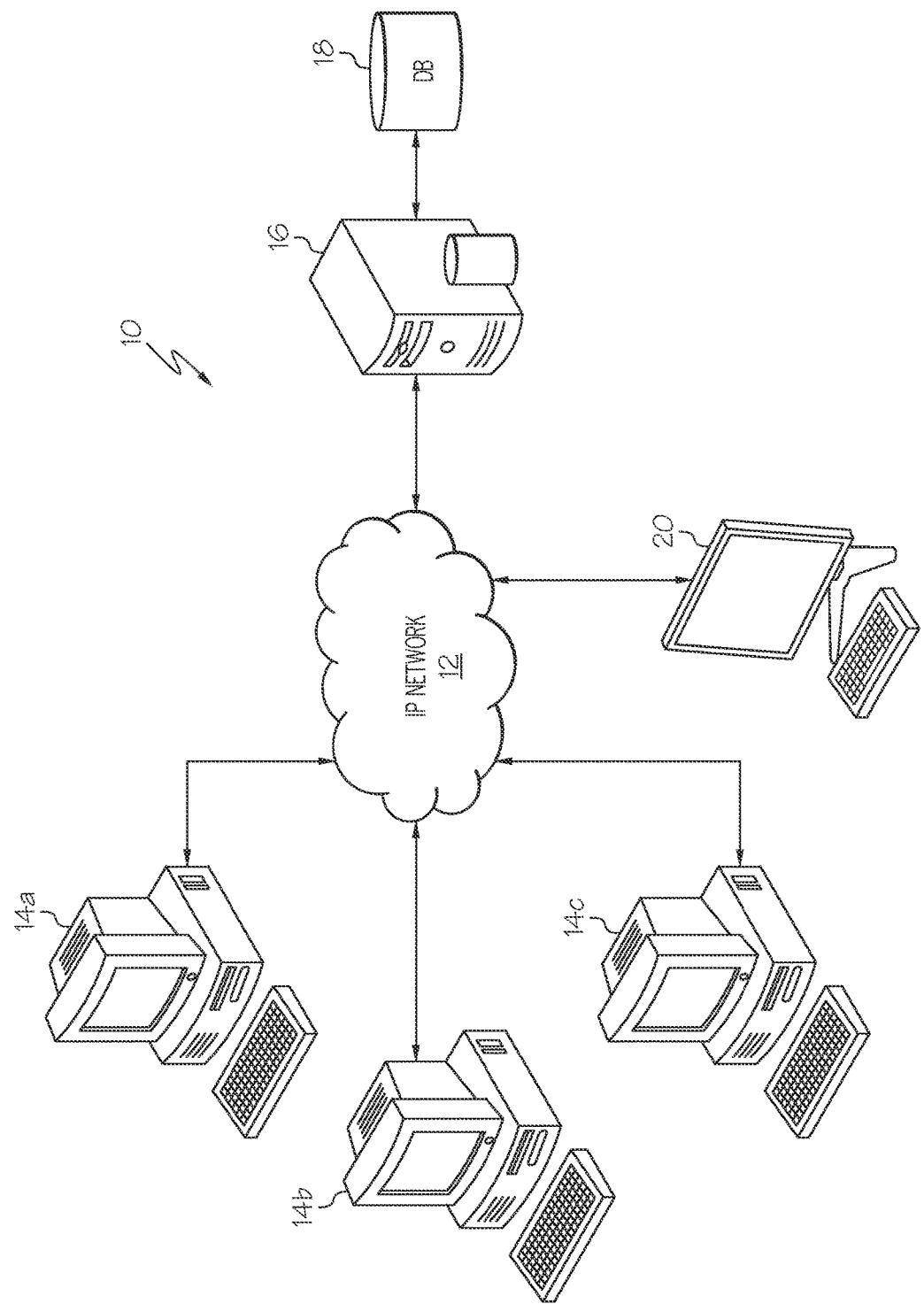
FIG. 1 is a block diagram illustrating some components of a computer network configured according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, embodiments of the present disclosure provide a computing device, a computer-readable storage medium, and a corresponding computer-implemented method for analyzing the content of recovery logs that are generated and maintained by a database based on commands executed by an application program that interacts with the database, and for graphically representing the results of that analysis in an interactive visual display for a user. More particularly, a recovery log comprises a plurality of transaction entries associated with various commands and data functions executed by a computing device. Given a predetermined timeframe, embodiments of the present disclosure analyze the transaction entries and group the transaction entries based on one or more user-defined attributes. The embodiments then generate one or more interactive graphical representations of the grouping for display to the user.

The graphical representation facilitates the user's ability to intuitively visualize and understand the analysis, such that the user is better able to identify and focus on a particular aspect of the execution of the database and/or the application program. Additionally, because the graphical representations displayed to the user are interactive, the user is more easily able to identify the particular details of a given graphical representation, thereby further enhancing the user's ability to visualize and understand the execution of the database and/or application program based on the log information generated and maintained by database.

FIG. 1 is a block diagram illustrating some components of a computer network 10 configured according to one embodiment of the present disclosure. As those of ordinary skill in the art will readily appreciate, the components of network 10 seen in FIG. 1 are for illustrative purposes only. That is, communication networks suitable for configuration according to the present embodiments may comprise more or fewer components, or in some cases, components that are different than those illustrated in FIG. 1. Additionally, it should be noted that the present embodiments are described in the context of database transactions and their related data objects. However, the specific mention of any database specific terminology or concept is for illustrative purposes only. The present embodiments may be utilized to graphically represent an analysis of other types of logs, regardless of whether those logs are associated with the execution of database commands. Thus, embodiments of the present disclosure may be utilized on transactional log files associated with non-database related applications.

Network 10 comprises a packet-data network 12 that communicatively interconnects a plurality of user terminals 14a, 14b, 14c (collectively, user terminals 14) and a control computer 20 with a database (DB) server 16. Additionally, DB server 16, which may comprise any application server known in the art, communicatively connects to a data storage device 18. Generally, application programs executing at the user terminals 14 communicate with a database program (e.g., DB2, ORACLE, and the like) executing on DB server 16 to store data to, and retrieve data from, storage device 18 in a series of transactions. As part of that process, the database program executing on DB server 16 generates and maintains one or more recovery logs for storage in a memory device, such as DB 18. The recovery logs, as described in more detail later, contain information associated with the transactions executed by the application programs running on user terminals 14 and are used, for example, in database recovery operations. The control computer 20, which is also described in more detail later, is configured to analyze the information stored in the recovery logs in accordance with one or more user-specified filters, and to generate various graphical representations of the analysis for display to the user. In this capacity, the control computer 20 is able to aid a Database Administrator (DBA) or other such user to better manage the database.

FIG. 2 is an example of the type of data that may be stored in a recovery log. Normally, the information stored in a recovery log is not in a human-readable format, although it may be in some cases. In cases where the data is not in readily human-readable form, the information is converted for display to a user. As seen in FIG. 2, for example, conventional applications may present the recovery log information as a table 40. Those of ordinary skill in the art will realize that the recovery log data seen in FIG. 2 is merely illustrative, and that recovery logs may contain information in lieu of, or in addition to, the information seen in FIG. 2.

In more detail, the recovery logs are generated by an application program, such as the database program executing on DB server 16. In this embodiment, the recovery log information is displayed as text in a tabular format comprising a plurality of columns of information. These include columns for a timestamp 42, a Unit of Recovery 44, a Plan Identifier (ID) 46, a Package Identifier (ID) 48, a User Identifier (ID) 50, and Object Identifier (ID) 52, and a command descriptor 54. Each record in the recovery log, illustrated here as a row in table 40, comprises information that is associated with a given transaction.

More specifically, timestamp 42 identifies a date and time in which the application command identified in the command descriptor 54 was executed by the database program on DB server 16. The Plan and Package IDs 46, 48, each identify an application program executing on one of the user terminals 14 that caused the database application on DB server 16 to execute that command. The Plan and Package IDs may be used together to identify a single application program executing at the user terminal 14a, 14b, 14c, or may be used to identify a set of application programs or functions executing at user terminal 14a, 14b, 14c. Whichever they identify, however, the Plan and Package IDs 46, 48 indicate which application program (or set of application programs and/or functions) issued the command indicated in the command descriptor 54, or caused the database program at DB server 16 to execute the command indicated in the command descriptor 54. Such commands, for example, may control DB server 16 to store data to, and retrieve data from, DB 18.

The user ID 50 identifies a user at the user terminal 14a, 14b, 14c associated with the execution of the particular command reflected in the command descriptor 54. By way of example, the user ID 50 may comprise a username employed by the user to log onto the user terminal 14a, 14b, 14c; however, any identifier is readily useable with the present embodiments. The object ID 52 identifies a particular table or object on which the command identified in the command descriptor 54 operates. By way of example only, the object ID 52 may identify a database table that is modified (e.g., created, updated) as a result of executing the command indicated in the corresponding command descriptor 54. Such information may be extracted, for example, from the command that is executed by the database program at DB server 16.

In addition to the information above, recovery log 40 also stores the Unit of Recovery (UR) value 44. The UR values 44, as seen in FIG. 2, comprise integers, but may comprise other types of data in lieu of, or in addition to, an integer. Each UR value 44 corresponds to a set of related commands that are executed by DB server 16, and that are reflected in recovery log 40. More particularly, the UR values 44 indicate which commands executed by the DB server 16 are associated with a given user transaction (e.g., update, etc.) performed on the database. Such data is useful as it identifies which set of transactions must be rolled back by DB server 16 in the event that a consistency issue is realized to maintain the integrity of the database.

In more detail, a user transaction comprises a sequence of actions (e.g., a set of related SQL commands) performed on the database. Irrespective of the particular actions, the consistency and integrity of a database should always be preserved. Thus, either all the commands associated with a given user transaction must be executed to perform some function or none of the commands can be executed.

By way of example only, in the course of a given user transaction, a plurality of database tables may be modified to add, update, or delete related information. Further, different commands may be used to update or modify those different tables. While the modifications are being performed, the tables become transiently inconsistent as the information contained in the affected tables is changed. Once the update process is successfully completed, all the changes may be committed and the database is brought to a new consistent state. However, the modification process is not successfully completed if an event occurs that prevents all the tables from being updated with the information. In these cases, the information stored in all the affected tables is inconsistent, and the set of commands used to perform that particular update must be undone or "rolled back."

The UR values 44 stored in the recovery log are therefore utilized to maintain the database in a consistent state. More specifically, the UR values 44 define a limited set of rollback operations to be performed on the database in the event of such a problem so that the database may be returned from a current inconsistent state to a previous consistent state. Thus, if one or more of the commands associated with a user transaction assigned the UR value of '3' was not successfully completed, leaving the tables in an inconsistent state, each of the SQL commands identified in the command descriptor 54 having the assigned UR value of '3' would be rolled back. Once the roll back is complete, the database would once again be in a consistent state.

As previously stated, conventional methods for enabling a user to view the data stored in a recovery log are cumbersome. That is, the sheer amount of data stored in a recovery log makes it difficult to display to a user in a meaningful way, thereby hindering the user from quickly and easily gleaning any meaningful information from the log data. For example, it can be difficult for a user viewing a part of a recovery log displayed in a table 40 to fully appreciate all the commands that may be associated with a particular UR value 44. In addition, conventional log analysis tools are not able to extract other types of information encapsulated within the recovery logs that may not be readily apparent to a user. Such information includes, but is not limited to, the number and/or frequency of COMMIT or ROLLBACK operations performed by the database application, the identification of QUIET times and/or QUIESCE points, and the like.

Accordingly, embodiments of the present disclosure provide a tool having an interactive Graphical User Interface (GUI) that graphically represents the content of the recovery log for a given timeframe such that the user (e.g., an operator, DBA, etc.) can quickly and easily understand the data. So informed, the user may be better able to optimize the database and identify potential problem sources, such as problems with the application programs operating at one or more of the user terminals 14*a*, 14*b*, 14*c*, and/or the database program operating at DB server 16.

Figure 3:
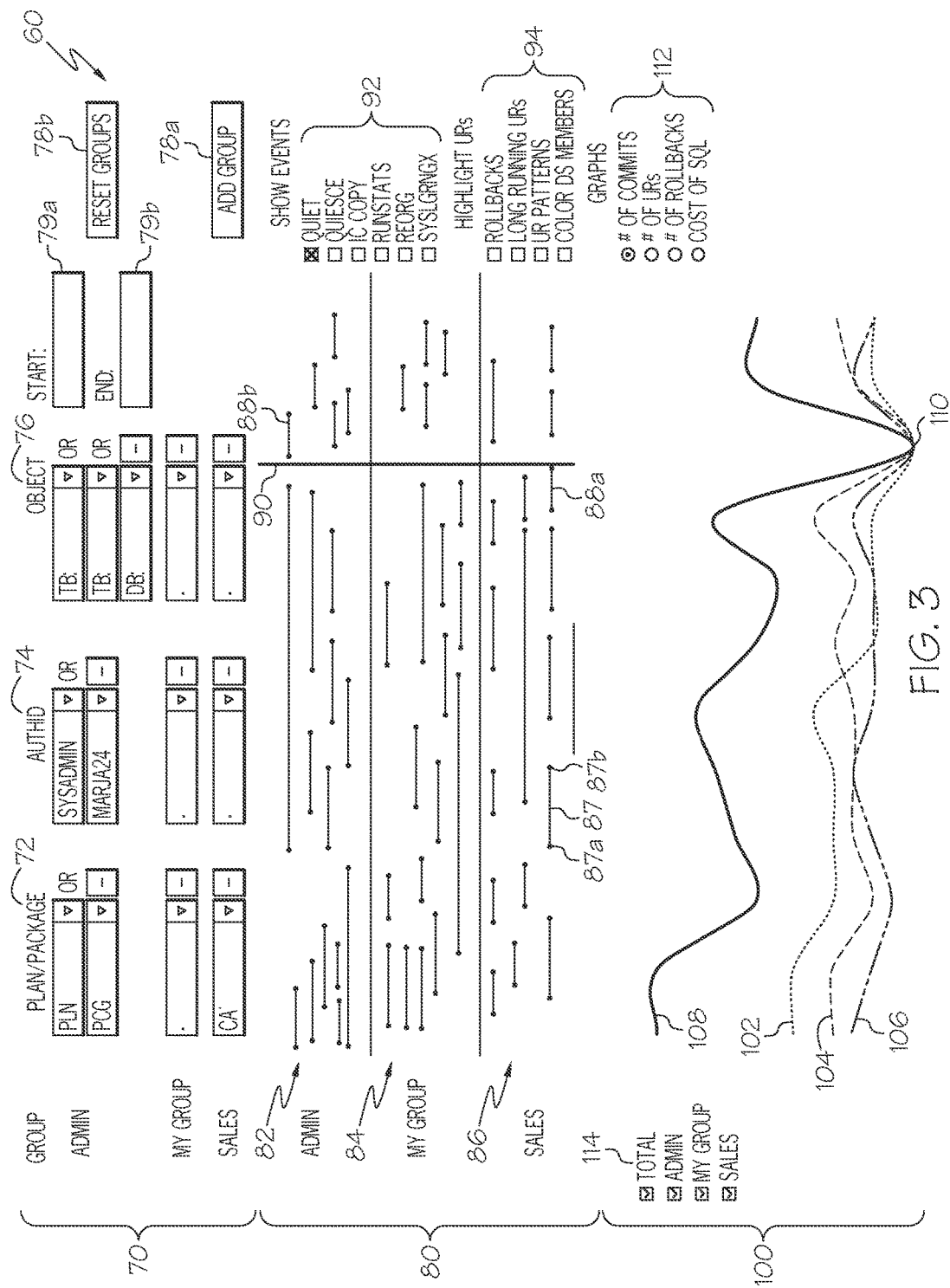
FIG. 3 is a perspective view of a Graphical User Interface (GUI) configured to display the information stored in a recovery log according to one embodiment of the present disclosure.

FIG. 3 is a perspective view of one such interactive GUI 60 according to one embodiment of the present disclosure. As seen in FIG. 3, GUI 60 comprises a filter section 70, a first graph section 80, and a second graph section 100. The filter section 70 is configured to display one or more filter controls 72, 74, 76 that allow a user to define corresponding "filters." Such filters will be used to filter the data stored in recovery log such that only the data in transaction entries matching the filter criteria is extracted for analysis. The filter controls 72, 74, 76 may represent any criteria needed or desired. However, in this embodiment, the filter controls 72, 74, 76 displayed on GUI 60 include a Plan/Package ID filter control 72, a user ID filter control 74, and an object ID filter control 76.

The Plan/Package ID filter control 72 allows a user to define the Plan and/or Package for analysis. The information in these controls, which may be input by the user, could be used, for example, in a comparison with the Plan ID 46 and/or the Package ID 48 data stored in the recovery log. Only the entries having these IDs would be analyzed. Similarly, the user ID filter control 74 and the object ID filter control 76 may be used to identify one or more specific users and/or database objects identified in the recovery log, respectively, such that only the entries having this specified information would be extracted for analysis.

As seen in filter section 70, the user may define multiple "groups" (e.g., "ADMIN," "MYGROUP," SALES"). Each group defines its particular filters, and further, the information for the filters. The information defined for each filter may be the same or different than the information defined for other groups. Thus, analyses may be performed on the different groups and displayed to the user so that the user can compare and contrast the behavior of the database with respect to different groups. To add a group, the user simply selects the "ADD GROUP" control 78*a*. Selecting this control will cause the GUI 60 to generate a set of filter controls 72, 74, and 76, and associate them with the new group. While not specifically shown here, the GUI 60 may present the user with a dialog box to obtain a name for the group, as is known in the art. To reset the groups to a default group, or to a default set of groups, the user selects the "RESET GROUPS" control 78*b*. Selecting this control will remove the currently displayed groups and their associated filter controls from the GUI 60, and replace them with a default group and set of filter controls 72, 74, 76. In some embodiments, the default group need not be specified, thereby associating the default group with all entries in the recovery log that fall within a predetermined timeframe.

The start and end time controls 79*a*, 79*b* allow the user to define the time constraints for constraining the analysis. Particularly, only those entries in the recovery log that fall within the defined time window specified by the start and end times will be utilized in the pursuant analysis, and as described in more detail below, in the generation of the various graphs that graphically represent the results of the analysis.

The particular groups illustrated in FIG. 3 represent groups of users. However, this is for illustrative purposes only as the present disclosure is not so limited. It should be understood that in other embodiments, the groups defined by the user for GUI 60 may represent something other than a set of users. For example, the user may define one or more groups to represent selected time periods in which users access the database. Additionally, or alternatively, a Database Administrator (DBA) may define one or more groups representing particular objects (e.g., tables) that are accessed. In some embodiments, the DBA may define a plurality of groups in which some groups represent different types of users and applications, and/or other groups representing different time periods.

The first graph section 80 of GUI 60 is for displaying a plurality of graphs, which in this embodiment, are graphs 82, 84, 86. Each graph 82, 84, 86 is generated from the results of the analysis performed on the recovery log and graphically represent the content of that log. As seen in more detail later, the graphs may represent any of a variety of different information; however, the graphs 82, 84, 86 graphically represent the content of the recovery log for a given user-defined timeframe in a way which is easy for users to understand and comprehend.

As seen in FIG. 3, graphs 82, 84, 86 correspond, respectively, to the user-defined groups in filter section 70. This facilitates the user's ability to specifically focus on one or more meaningful attributes of the data being displayed for a given group. Such attributes correspond to the data defined in the filter controls 72, 74, 76 of filter section 70. Further, each graph 82, 84, 86 is "UR based." That is, the data used to generate graphs 82, 84, 86 for GUI 60 is based on the UR values 44 stored in the recovery log.

To ensure that the graphs 82, 84, 86 are intuitive to a user, embodiments of the present disclosure generate graphs 82, 84, 86 to comprise a plurality of line segments 87. Each line segment 87 represents a set of UR values, and the length of a given segment representing a time duration of the corresponding UR. As seen in FIG. 3, for example, line segment 87 begins at a start time 87a, defined by a first timestamp stored in the recovery log, and ends at an end time 87b that is defined by a second timestamp in the recovery log. Thus, the longer the length of line segment 87, the longer the database application needed to successfully complete the actions (i.e., the commands) associated with the UR. Such information is valuable to a user when converted from the recovery log and intuitively displayed when monitoring the operations of the database.

By way of example, the user is able quickly visualize certain events that occur with respect to database accesses simply by looking at graphs 82, 84, 86. One such event, which is described in more detail later, is a QUIET event in which the database program does not perform any read or write operations. As seen in FIG. 3, for example, a QUIET event occurs between the end of line segment 88a in the SALES group and the beginning of line segment 88b in the ADMIN group. That is, the absence of line segments on each of the graphs 82, 84, 86 between the end timestamp of line segment 88a and the start timestamp of line segment 88b indicate that no data operations are being performed. In this embodiment, an indicator 90 comprising a substantially vertical bar is overlaid onto the graphs 82, 84, 86 at the point (i.e., during the time period) where the database program is QUIET to indicate the lack of transactions during this time range. So informed, a DBA or other appropriate user may determine that usage of the database during these times is low, and schedule a resource-intensive function to execute during that time so as to minimize the impact on users.

As described in more detail later, the first graph section 80 may be used to graphically illustrate other UR-based events as well. Such events may be predefined and selectable by the user using event controls 92 and UR controls 94. For example, in this embodiment, the user may select to view the graphs 82, 84, 86 in light of information related to one or more of a Quiesce event (i.e., QUIESCE), an Image Copy event (IC COPY), a statistics event (i.e., RUNSTATS), a reorganization event (i.e., REORG), and a System Log (i.e., SYSLGRNGX) event. With each event, a computing device executing the GUI 60 (e.g., control computer 20) analyzes the recovery log information with respect to the user-supplied filter information, generates one or more graphs of line segments according to the results of that analysis, and displays the resultant line segment graphs in the first graph section 80.

Additionally, the user may select one or more of the UR controls 94 to specifically indicate certain predefined operations, occurrences, and/or functions within the graphs 82, 84, 86. These may include, but are not limited to, rollback operations (i.e., ROLLBACK), long running URs (i.e., LONG RUNNING URs), UR patterns (i.e., UR PATTERNS), and Data Sharing MEMBERS (i.e., DS MEMBERS). Particularly, line segments that represent aspects of the database operation identified by one or more of the selected UR controls 94 are highlighted or otherwise visually enhanced for the user. As seen later in more detail, such visualization enables the user to easily discern specific sets of commands belonging to a particular UR that may be problematic.

The second graph section 100 is a section of GUI 60 configured to display one or more additional graphs to help the user visualize the content of the recovery log. In this embodiment, the second graph section 100 comprises a plurality of line graphs 102, 104, 106, and 108. Each graph 102, 104, and 106 corresponds, respectively, to one of the line graphs 82, 84, 86 displayed in the first graph section 80, and may be selectively displayed by the user using the selection control buttons 114. When displayed, each graph 102, 104, 106 graphically represents statistical information for its respective group (e.g., ADMIN, MYGROUP, SALES). Such information, as stated previously, is gleaned from the data in the recovery log.

The particular information used to generate graphs 102, 104, 106 may comprise any information needed or desired; however, in this embodiment, the information is predefined and displayed in GUI 60 to the user as a plurality of radio button controls 112. With these controls 112, the user is able to specifically identify the statistical information that should be represented by the graphs 102, 104, 106.

For example, if the user selects the "# OF COMMITS" radio button control, the recovery log is analyzed to determine how many COMMIT actions were performed by the database over the predefined time period. Similarly, when the user selects the "# OF URs" radio button control, the recovery log is analyzed to determine how many URs exist for the predefined time period. If the user selects the "# OF ROLLBACKS" radio button control, the recovery log is analyzed to calculate how many ROLLBACK operations were performed over the predefined time period. When the user selects the "cost of SQL" radio button, the SQL commands in the recovery log are analyzed and the results input into a function that computes the cost of the SQL command execution in terms of processing cycles or resources used, for example.

Regardless of the specific radio button selected by the user, however, the line graphs 102, 104, 106 graphically represent statistical information that augments the data graphically represented by corresponding graphs 82, 84, 86 in the first graph section 80. For example, each line graph 102, 104, 106 in FIG. 3 graphically illustrates the "# OF COMMITS" that were performed for its respective group over the predefined time period. Additionally, indicator 90 in the first graph section 80 identifies a QUIET time in the database operations in which no commands were executed. Each of the line graphs 102, 104, 106 has a "dip" at point 110 that goes to zero, indicating that there were no database commands performed during this period. Therefore, the information graphically represented in each of the line graphs 102, 104, 106 also visualizes the QUIET time graphically indicated by indicator 90 in the first graph section 80.

As seen in FIG. 3, the second graph section 100 may also include a fourth line graph 108. Graph 108, which may also be selectively displayed by the user using selection controls 114, graphically represents the aggregate of the statistical information for all the graphs 102, 104, 106 that are displayed in the second graph section 100. Thus, the information graphically represented by graph 108 corresponds to the information graphically represented by all of the graphs 82, 84, 86 displayed in the first graph section 80.

Figure 4:
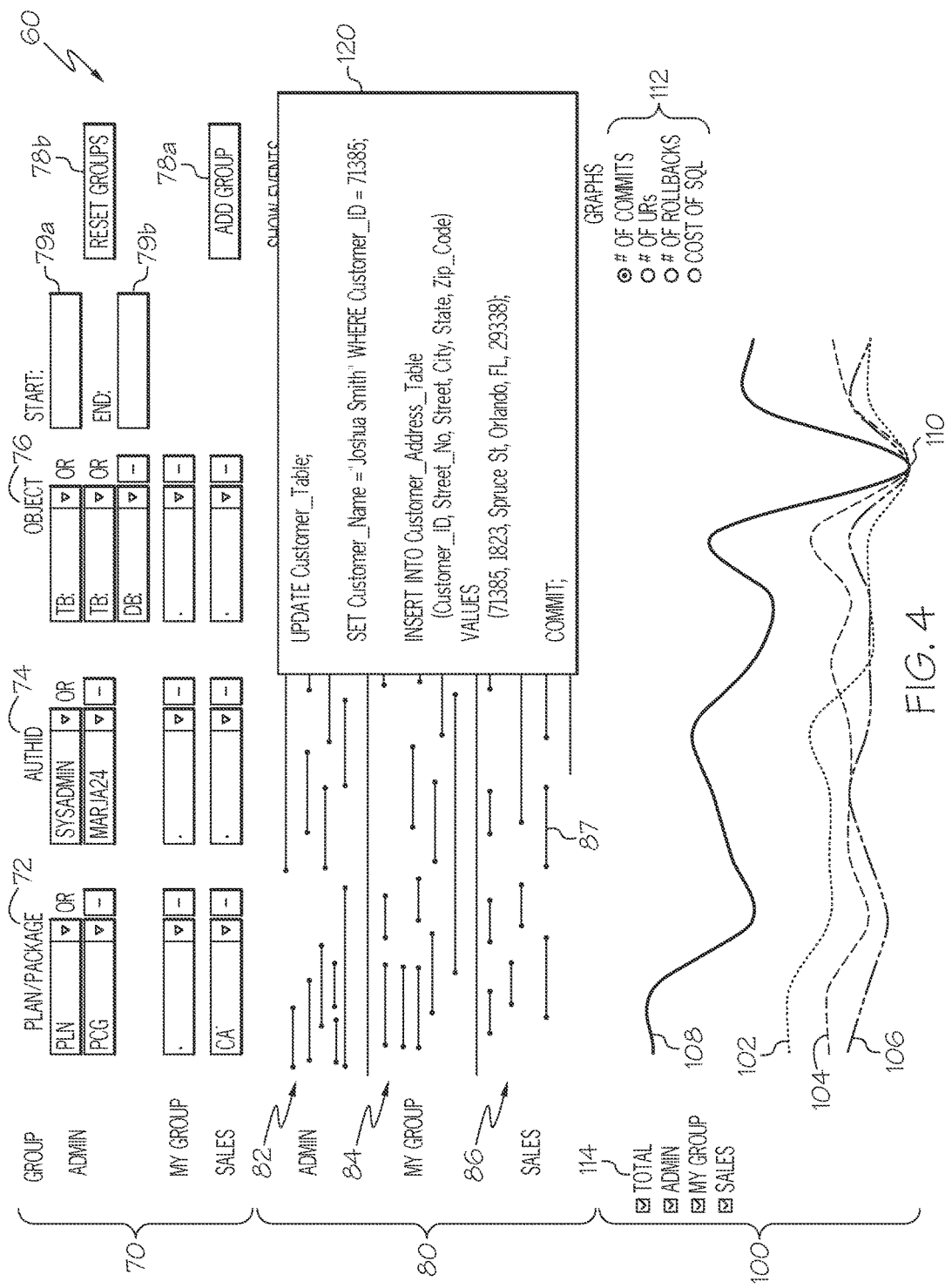
FIG. 4 is a perspective view of a GUI configured to display the information stored in a recovery log according to another embodiment of the present disclosure.

As previously stated, GUI 60 is an interactive GUI in which the user is able to selectively determine additional, more detailed information about a particular UR of interest. For example, as seen in FIG. 4, the user may select a particular line segment (e.g., line segment 87 in graph 86). In response to the selection, GUI 60 generates an overlay window 120, and displays the SQL commands and corresponding data in the window 120. The commands and data displayed in window 120 are those that are associated with the particular UR represented by the line segment 87 and that are stored in the recovery log. So displayed, the user may be able to determine whether a problem exists with a user application that caused these commands to be executed by the database application, or with the database application that executed them. Additionally, this information may help the user to determine whether optimizations and/or modifications should be made to any of the applications that access the data, or to the architecture of the database itself.

FIGS. 5-10 illustrate some exemplary graphs generated by embodiments of the present disclosure for display in the first graph section 80 of GUI 60. Those skilled in the art will readily appreciate that the graphs in each of these figures comprise line segments, such as those seen in graphs 82, 84, 86. However, other types of graphs may also be utilized.

Figure 5:
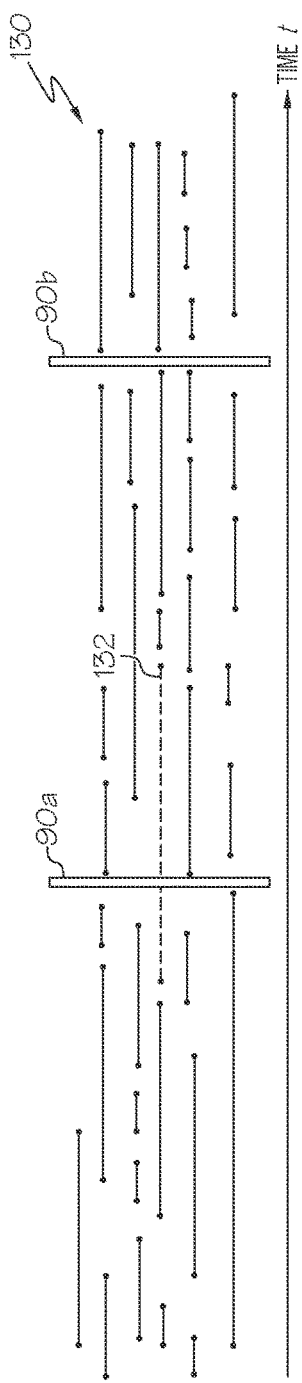

FIG. 5 particularly illustrates a graph 130 that graphically represents QUIET times. As stated above, QUIET times are time ranges during the predefined time period in which there is little or no database activity. Such time ranges are indicated in this embodiment by indicators 90*a* and 90*b*. Specifically, indicator 90*a* intersects a first line segment 132 indicating that the only activity occurring during that time range is that associated with the UR represented by line segment 132. Thus, line segment 132 is an "open" UR, meaning that the commands associated with the UR represented by line segment 132 were still being executed, or that the data associated with those commands was not yet committed during that time range. Indicator 90*b*, in contrast, does not intersect any line segments indicating that there is no database activity occurring during that time range.

QUIET times may be determined by the present embodiments using any known method. However, in one embodiment, a device configured to operate according to the present disclosure counts the number of "open" URs per unit time to determine which time ranges are associated with the least amount of database activity. Any time ranges in which the number of "open" URs are below a predetermined threshold value may be considered QUIET times. Once the count is determined, the device generates one or more indicators 90*a*, 90*b* and overlays those indicators onto graph 130 at the time ranges of interest. Additionally, the device may highlight or visually enhance any line segment that is intersected by an indicator, such as line segment 132, to particularly identify those "open" URs to the user.

By allowing the user to easily visualize the QUIET times using a graph such as graph 130, the user can better determine whether to perform a particular database function or maintenance operation, and if so, when it is best to perform that function or operation. By way of example only, some database administrators (DBAs) may temporarily place the database objects in a "QUIESCE" state in which no database transactions are permitted to occur. Placing the database in such a state may be required, for example, in situations where the DBA needs to perform a function that can only be safely performed by the DBA (e.g., changing the schema of a database table), and where other user-initiated transactions could interfere with that function. By visually indicating historical QUIET times to the DBA, he/she is better able to predict a future time which is best to place the database in a QUIESCE state so that normal database operations are either affected on a very limited basis, or not affected at all.

Figure 6:
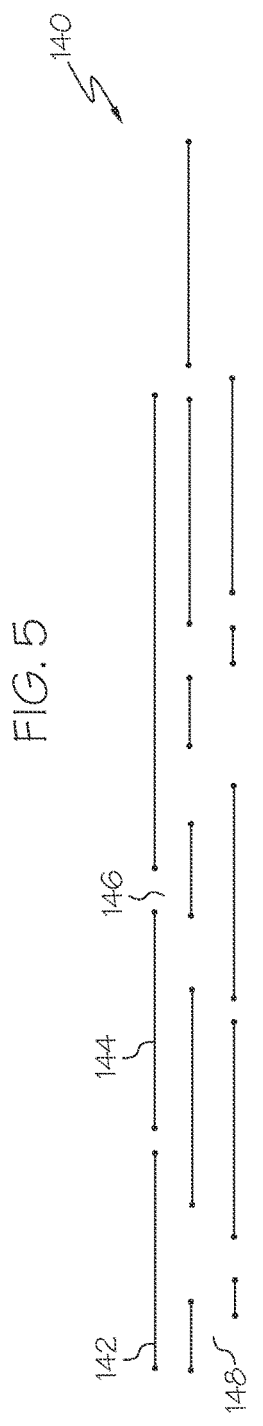

FIG. 6 illustrates a graph 140 that graphically represents information extracted and converted from an analysis performed on both the recovery log and the SYSLGRNX table. The SYSLGRNX table stores recovery log ranges that indicate the times an index space or a table space was "open" for updates. This type of information provides an efficient way for embodiments of the present disclosure to find and access the appropriate log records associated with the recovery log data to find specific objects (e.g., a specific table), rather than having to scan the data in every recovery log record for those particular objects.

Graph 140 of FIG. 6 displays multiple sets of line segments positioned in close vertical proximity to each other. Particularly, a first set of line segments (e.g., line segments 142, 144) graphically represent the data associated with respective URs gleaned from the recovery log. A second set of line segments (e.g., line segment 146, 148) is positioned directly below the first set of line segments and graphically represent the information gleaned from the SYSLGRNX table. According to the present disclosure, the user can view each of the line segments 142, 144, 146, 148 and determine whether there is a potential problem with the database or the applications that are accessing the database.

For example, as previously stated, URs are "open" when the commands associated with those URs are being executed to access and/or modify various objects (e.g., tables and/or indices) by the database application. However, simply because a UR is "open" does not necessarily mean that these objects are being physically updated. There may be undesirable situations in which the objects are not being accessed or written to even though the object is locked preventing other users from writing to that object. For example, as seen in graph 140, most of the line segments in both the first and second set of line segments substantially overlap each other. This includes the overlap seen between the line segments 144 and 146. However, line segment 142 and line segment 146 do not substantially overlap. As such, a user viewing graph 140 might determine that the objects associated with the UR represented by line segment 142 are being held open longer than needed. This could, for example, indicate that the application program accessing the objects is not optimized or particularly well designed. Thus, given this visual indication, the user may select line segment 142, as previously described, to obtain additional information about the particular command(s) associated with the line segment 142 in a window 120, and investigate the corresponding UR further.

Figure 7:
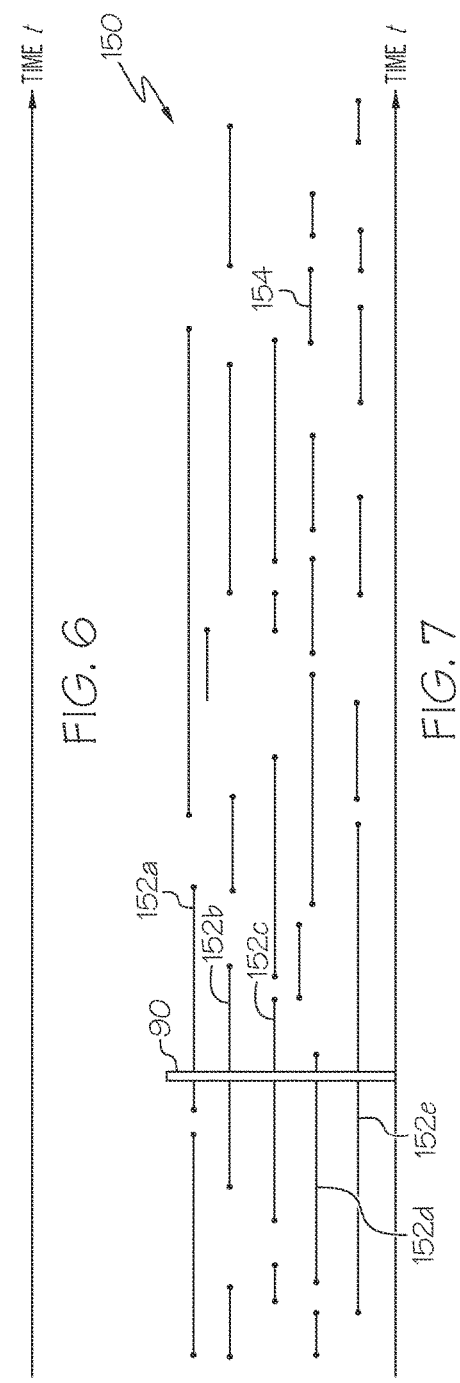

FIG. 7 illustrates a graph 150 that graphically illustrates an optimal time at which to execute database utility programs. More particularly, running database utility programs can often cause outages. However, some utilities (e.g., data backups) are important for purposes of disaster recovery. Therefore, it is desirable to have a strategy that defines which utilities to run at which particular time. The information represented in the graph 150 allows a user such as a DBA, for example, to define such a strategy.

For example, as seen in FIG. 7, embodiments of the present disclosure analyze the recovery log to determine when the commands associated with the URs were executing, as previously described. The results of that analysis are then displayed graphically by GUI 60 as line segments. The indicator 90 is then overlaid on graph 150 to indicate when a utility should, or should not, be run. As seen in FIG. 7, indicator 90 is displayed by GUI 90 such that it intersects multiple line segments 152a-e. Thus, this particular time would not be optimal for running a utility program to back up data because, should an error occur, all the objects associated with the URs represented by line segments 152a-e would need to be rolled back to return the database to a consistent state. Such operations take time. However, presented with the graph 150, the user might determine that a better time to run the utility would be around the time that the UR represented by line segment 154 is "open." That way, if an error occurred while running the utility, a minimum number of rollback operations would be needed to return the database to a consistent state. Thus, embodiments of the present disclosure analyze the data in the recovery log and convert that data to a visual indicator that identifies the best times to run a given utility program to a user.

FIG. 8 illustrates a graph 160 that graphically represents which line segments, and thus, which URs, are associated with rollback operations. As seen in FIG. 8, some URs of interest are represented by line segments 162, 164, and 166, and are highlighted, or otherwise visually enhanced, to indicate those URs to the user. Rollback operations, as known in the art, are expensive in terms processing power and resources and may cause outages. When a sequence of rollback events occurs across applications, it is difficult to identify a root cause of the rollback. However, by displaying graph 160, GUI 60 enables the user to visualize all the "rollback" URs and their associated objects quickly and easily, and to determine whether the rollback operations occur in a pattern. Doing so allows the user to identify any poorly written or designed application programs.

FIG. 9 illustrates a graph 170 graphically representing "long-running" URs. "Long-running" URs are those in which the associated objects (e.g., tables, indices, etc.) remain "open" for at least a predetermined amount of time. Such long-running URs are almost always problematic for database operations. Particularly, the objects associated with a long-running UR typically remain locked for the duration. Thus, other applications and functions (e.g., utilities, recovery tasks, user applications, etc.) are prevented from performing needed accesses to these objects during this time. Users such as DBAs are typically always trying to identify long-running URs and make the necessary changes and/or adjustments (e.g., coding changes, optimizations, etc.) to eliminate long-running URs.

Therefore, embodiments of the present disclosure compute the length of time that a UR remains open. For example, one embodiment calculates a time difference between the start and end timestamps of each UR. If the calculated time difference for any UR is less than a predetermined threshold time difference, the line segments for those URs (e.g., line segments 172a, 172b) are displayed normally. However, if the calculated time difference is greater than or equal to a predefined threshold time difference, identifying them as long-running URs, the line segments for those long-running URs (e.g., line segment 174) are highlighted or visually enhanced such that the user looking at graph 170 on GUI 60 can easily visually discern those particular URs.

FIG. 10 illustrates a graph 180 that graphically represents various Data Sharing (DS) members such that a user can easily identify related URs. This is beneficial as it allows a DBA or other user to immediately identify potential or actual problems or conflicts with the database.

More particularly, different application programs, such as those executing on user terminals 14a, 14b, 14c, normally read from, and write to, the same database objects simultaneously. As is known in the art, however, these applications may run on different, but communicatively connected, database subsystems. The collection of these database subsystems are commonly referred to as a DS group, while the individual subsystems of the DS group are referred to as DS members.

Because the application programs may run on different subsystems, a greater possibility for conflicts may exist. Although the DS functionality at the database generally manages such conflicts (e.g., by managing the locking/unlocking of the associated database objects, etc.), those functions do not provide a complete picture. There is still information about the DS members that can be gleaned from the information in the recovery log. Thus, as seen in FIG. 10, embodiments of the present disclosure generate graph 180 to visually enhance the line segments representing URs at different DS members. By way of example only, line segments 182a, 182b, and 182c may be displayed in one color to indicate that those URs are associated with a first DS member, while line segments 184a, 184b, and 184c are displayed in a second, different color to indicate that those URs are associated with a second, different DS member.

By visually enhancing the line segments according to their associated DS members, the present disclosure facilitates a DBA's ability to easily identify a distribution of workload across the database objects from all DS members for the predetermined period of time. For example, consider a set of database tables and indices that are associated with a first DS member, but are normally accessed by a group of application programs associated with a second DS member. Graph 180 allows the DBA to identify that the transactions for accessing the tables and indices are actually executing on a different DS member. Thus, so informed, the DBA can perform the necessary functions to rebalance the workload from the first DS member to the second DS member to even out the workload distribution.

The present embodiments are able to identify the various DS members using any method known in the art. However, in one embodiment, the present disclosure utilizes the fact that each different DS member is associated with its own independent recovery log. Particularly, the present disclosure performs the above-described analysis on each of the recovery logs and maintains a mapping that correlates each recovery log to each corresponding DS member. The results of each of those individual analyses are then used to generate and display the various line segments to indicate their associated DS members, as previously described.

Figure 11:
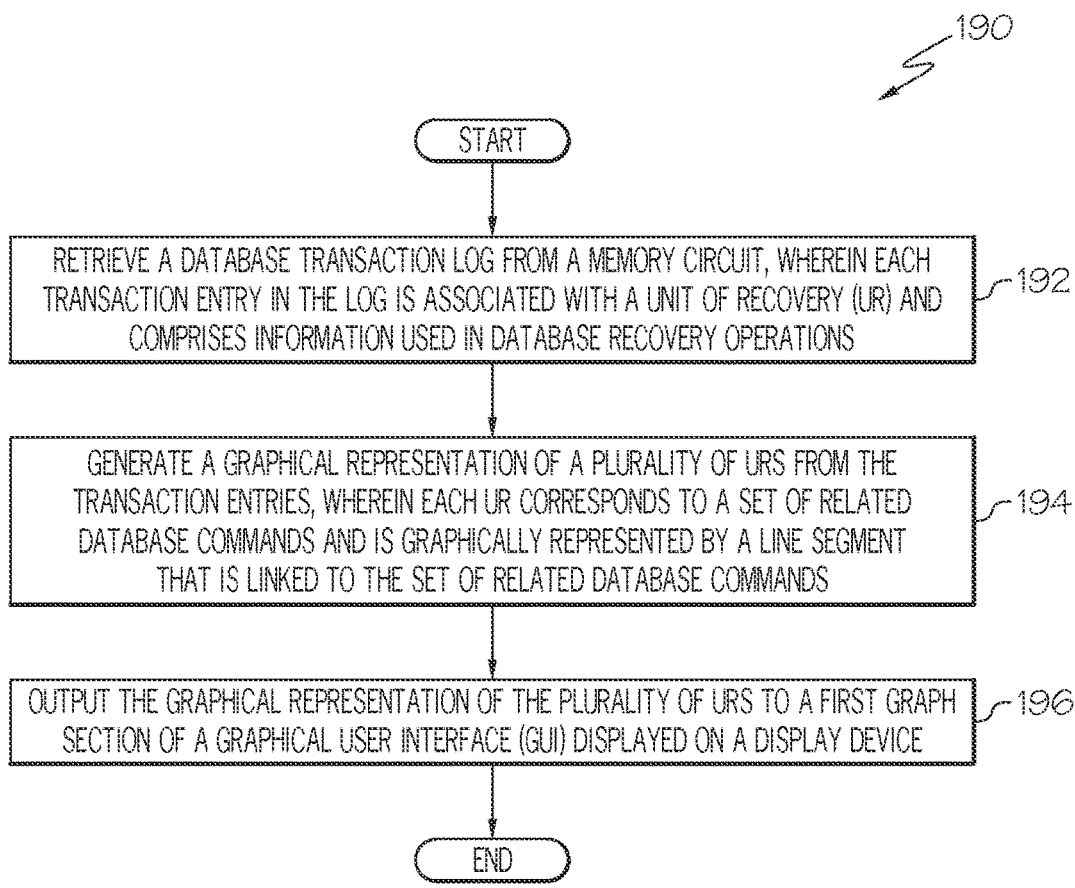
FIG. 11 is a flow chart illustrating a method for generating graphs from the transaction entries in the recovery log according to one embodiment of the present disclosure.

With the above embodiments in mind, FIG. 11 is a flow chart illustrating a method 190 for generating one or more of the above-identified graphs from the transaction entries in the recovery log according to one embodiment of the present disclosure. Particularly, method 190, which may be performed by the control computer 20, for example, calls for retrieving a database recovery log from a memory (box 192). The recovery log comprises, in this embodiment, a plurality of transaction entries. Each transaction entry is associated with a UR and comprises information that is used in database recovery operations, such as data recovery or disaster recovery.

Once retrieved, method 190 calls for generating a graphical representation of a plurality of URs from the plurality of transaction entries (box 194). As previously described, each UR, which corresponds to a set of related database commands, is graphically represented by a line segment that is linked to the set of related database commands. Each line segment is associated with a start timestamp and an end timestamp, and is generated to have a length that is proportional to the time difference between its start and end timestamps. Thus, a UR that is associated with a longer time difference will be generated by method 190 to appear longer in length than a UR having a shorter time difference.

The graphical representations of the plurality of URs are then output to the first graph section 80 of GUI 60 for display to a user (box 196). As described in the previous embodiments, the graphical representations are generated and displayed in method 190 in accordance with the one or more user-specified filters in filter section 70. So displayed, the user (e.g., a DBA or other database administrator) is able to identify potential problems and issues with the database, optimize the database, schedule the execution of desired application or utility programs, and the like.

Figure 12A:
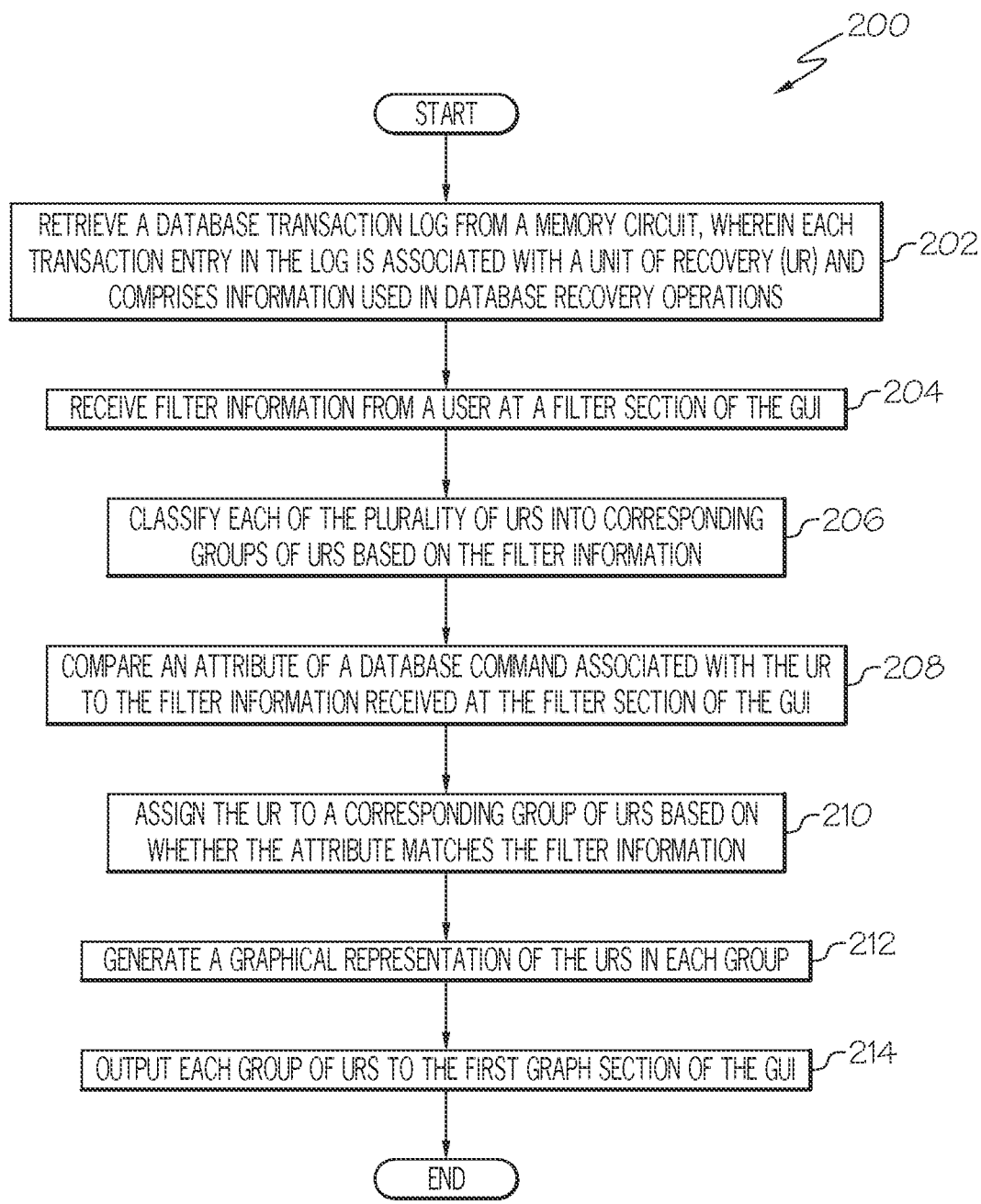
FIGS. 12A-12C are flow diagrams illustrating a method for generating graphs from the transaction entries in the recovery log according to another embodiment of the present disclosure.
Figure 12B:
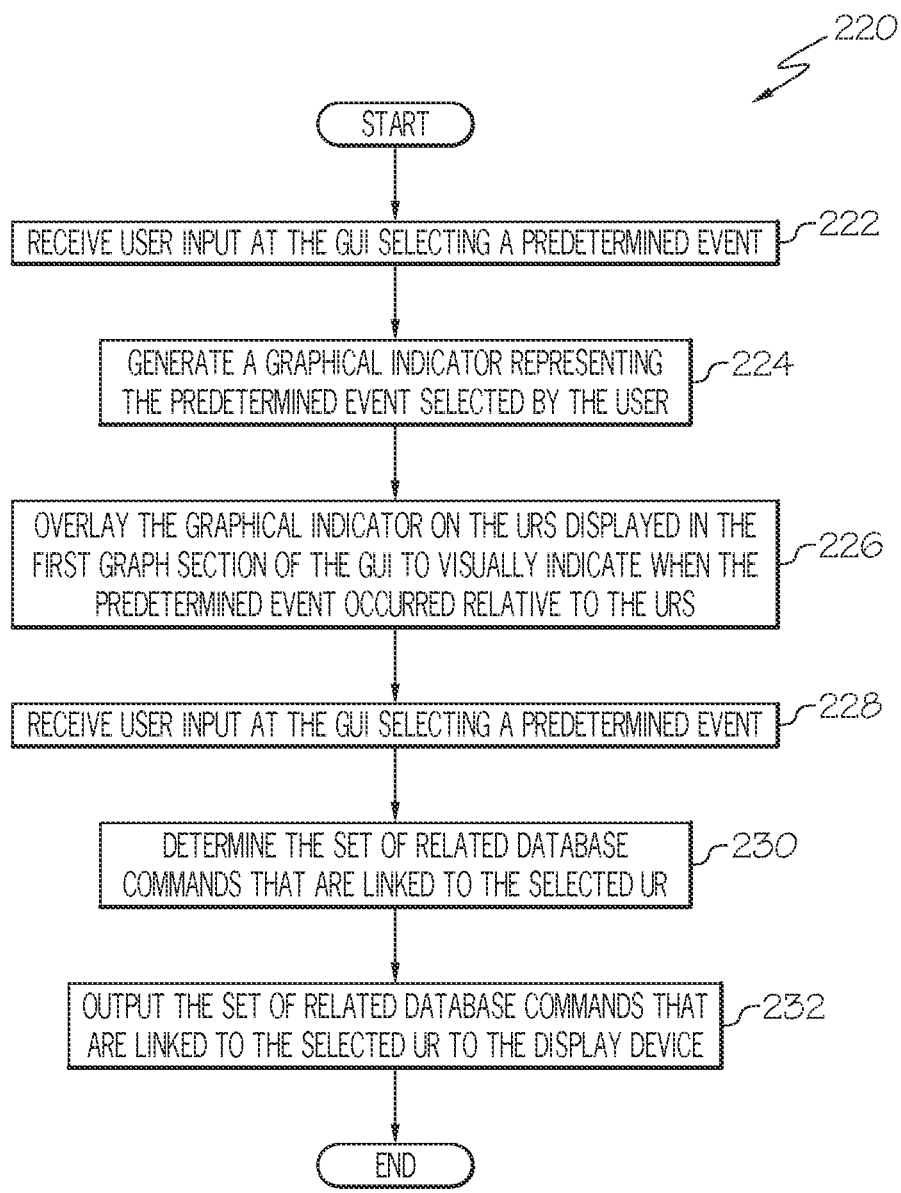
Figure 12C:
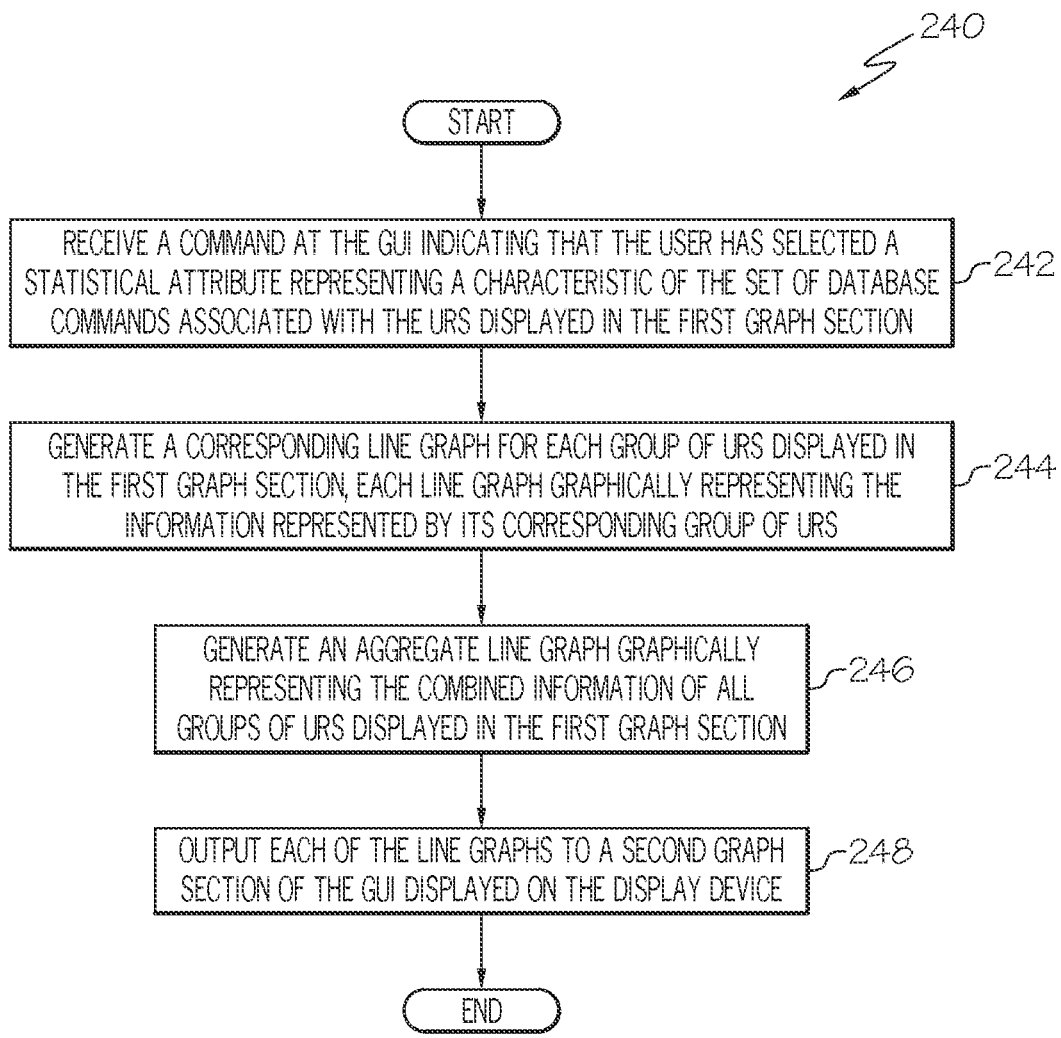

FIGS. 12A-12C are flow diagrams illustrating methods for generating graphs from the transaction entries in the recovery log according to another embodiment of the present disclosure. More specifically, FIG. 12A is a flow diagram illustrating a method 200 for generating groups of URs according to user-specified filter information, and for displaying graphs as described in the previous embodiments for those groups in the first graph section 80 of GUI 60.

Method 200, which may be performed by a processing circuit of a computing device, such as control computer 20, begins with retrieving the database recovery log from a memory circuit (box 202). The recovery log, as previously described, comprises a plurality of transaction entries. Each entry is associated with a UR and comprises information used for database recovery operations, such as data recovery or disaster recovery. Method 200 also receives filter information from a user via the GUI 60 (box 204). Particularly, after defining the desired groups, the user may input filter information via the filter section 70 of GUI 60 for each of the groups to focus the analysis performed on the entries of the recovery log to particular aspects of interest. In this embodiment, the filter information defines one or more Plan IDs 72, Package IDs 74 (which may identify particular application programs), user IDs 76, and Object IDs 78; however, the use of other information for filtering is also possible.

Upon receiving the filter information, method 200 calls for classifying each of the plurality of URs into a corresponding one of the groups of URs based on the filter information (box 206). Particularly, in one embodiment, method 200 calls for comparing an attribute extracted from the transaction entry to the filter information received at the filter section 80 (box 208). Based on the comparison (e.g., a match condition), the method 200 will assign the UR associated with the entry to one of the defined groups of URs (box 210). Once all the entries are assigned, method 200 will generate the graphical representations of the URs in each group (i.e., generate the line segment graphs previously described) (box 212), and output those graphical representations to GUI 60 for display in the first graph section 80 (box 214).

FIG. 12B is a flow chart illustrating a method 220 for visually enhancing the graphs displayed in the first graph section 80 to allow the user to easily interpret the information. Particularly, method 220 calls for GUI 60 to receive user input defining which particular events to graph via controls 92 and/or 94 (see FIG. 3) (box 222). As described previously, these events correspond to one of the predefined events available for selection to the user (e.g., QUIET TIMES, QUIESCE, # OF ROLLBACKS, etc.), and will be used to generate the graphs in the first graph section 80, as well as to visually enhance the line segments that comprise those graphs (e.g., different colors, highlights, etc.). Method 220 will then generate a graphical indicator, such as indicator 90, for example, representing the selected predetermined event (box 224), and overly that indicator over the URs in the first graph section 80 (box 226). The indicator is to visually indicate when the predetermined event occurred relative to the URs.

As previously described, the GUI 60 is interactive, and thus, allows the user to select a given UR to determine more information about that UR. To that end, method 220 calls for the GUI 60 receiving additional input from the user, such as a mouse click, for example, on a particular line segment displayed with the graphs (box 228). Upon detecting the user selection, the method 220 determines the set of database commands that are related to the selected UR (box 230). In one embodiment, for example, embodiments of the present disclosure will extract the database commands and their associated user data, if any, from the recovery log as previously described. Once extracted, these embodiments may generate a dialog window, for example, for display to the user on GUI 60, and populate that window with the particular commands and data that are linked to the selected UR (box 232). As was seen in FIG. 3, the window may be overlaid on at least a part of the first graph section 80.

It should be noted that GUI 60 is not limited to providing detailed information specifically in response to receiving a mouse click. In some embodiments, GUI 60 also provides the user with so-called "zoom-in" and "zoom-out" functionality. In these embodiments, the user may place the mouse pointer on a particular area of interest, such as on a selected area of a graph for example, and then use the scroll wheel of the mouse (e.g., "scroll up") to "zoom-in" on the selected area. Zooming-in on the selected area could, for example, shorten the time period for which the graph is displayed and/or display the particular details for one or more line segments in the selected area. Similarly, using the scroll wheel of the mouse (e.g., scroll down) to "zoom-out" of the selected area could lengthen the time period for which the graph is displayed. Zooming-out may decrease the number of details that are available to the user, but could provide a broader overview of a given graph and its representative information.

FIG. 12C is a flow diagram illustrating a method 240 by which the line graphs displayed in the second graph section 100 are generated and displayed to the user. Method 240 begins with the GUI 60 receiving user input at the controls 114 identifying the groups for which a line graph will be generated, and at controls 112 identifying which particular aspect of the URs the line graphs should represent (e.g., number of commits, rollbacks, etc.) (box 242). Once the information is received, method 240 generates a corresponding line graph for each group of URs displayed in the first graph section (box 244). As previously described, each line graph graphically represents the information associated with its corresponding group. In addition, method 240 also generates an aggregate line graph that graphically represents the aggregated statistical information for all the graphs displayed in the second graph section 100 (box 246). Method 240 then outputs each of the line graphs to the second line section 100 of GUI 60 for display to the user (box 248).

Figure 13:
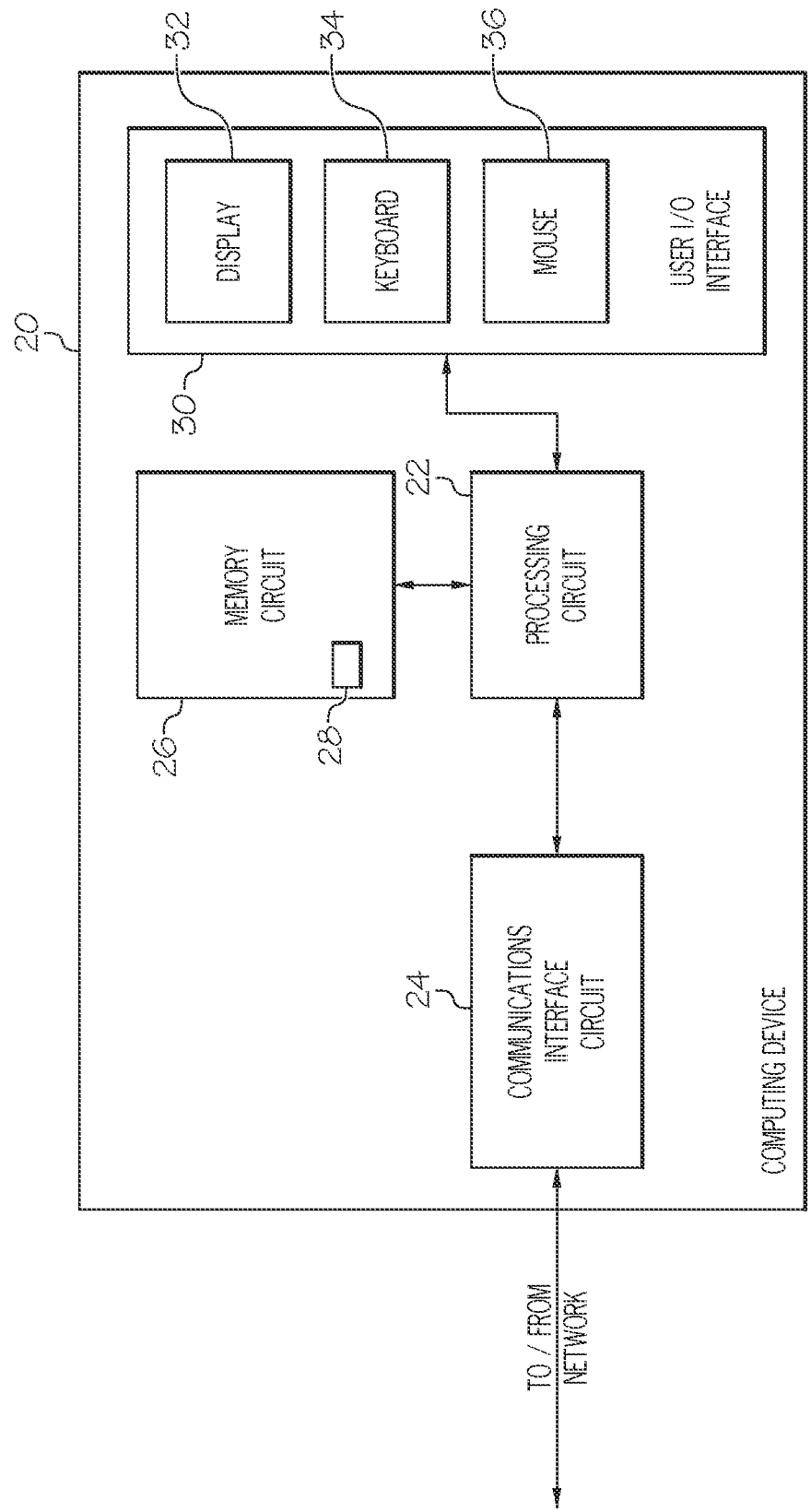
FIG. 13 is a block diagram illustrating some functional components of an exemplary computer device configured to process the transaction entries in a recovery log according to one embodiment of the present disclosure.

FIG. 13 is a functional block diagram of control computer 20 configured to perform the embodiments of the present disclosure. As seen in FIG. 13, control computer 20 comprises, inter alia, a processing circuit 22, communications interface circuitry 24, memory circuitry 26, and a user Input/Output (I/O) interface 30. Those skilled in the art will readily appreciate that control computer 20 is not limited solely to the components seen in the figure, but rather, may comprise other hardware and/or software components as needed or desired.

Processing circuit 22 may be implemented by circuitry comprising one or more microprocessors, hardware, firmware, or a combination thereof. Generally, processing circuit 22 controls the operation and functions of the control computer 20 according to appropriate standards. Such operations and functions include, but are not limited to, communicating with DB server 16, and if needed, one or more of the user terminals 14a, 14b, 14c via network 12. Additionally, according to various embodiments of the present disclosure, processing circuit 22 is configured to retrieve one or more recovery logs via network 12, analyze those logs, and generate one or more graphs that graphically illustrate the results of that analysis for display to the user in one or both of the first and second graph sections 80, 100 of GUI 60. Further, the processing circuit is configured to execute the software that defines GUI 60 for display to the user. To that end, the processing circuit 22 may be configured to implement a control program 28 stored in memory circuitry 26 that comprises the logic and instructions needed to perform the method of the present disclosure according to the embodiments as previously described.

The communications interface circuitry 24 may comprise, for example, an I/O card or other interface circuit configured to communicate data and information with the DB server 16 and one or more of the user terminals 14a, 14b, 14c via network 12. As those of ordinary skill in the art will readily appreciate, the communications interface circuit 24 may communicate with these and other entities using any known protocol needed or desired. In one embodiment, however, communications interface circuitry 24 sends data to and receives data from such remote computing devices via network 12 in data packets according to the well-known ETHERNET protocol. In this regard, communications interface circuitry 24 may comprise an ETHERNET card.

Memory circuitry 26 may comprise any non-transitory, solid state memory or computer readable storage media known in the art. Suitable examples of such media include, but are not limited to, ROM, DRAM, Flash, or a device capable of reading computer-readable storage media, such as optical or magnetic storage media. Memory circuitry 26 stores programs and instructions, such as the control program 28 previously mentioned, that configures the processing circuit 22 to retrieve one or more recovery logs via network 12, perform an analysis on those logs, and generate one or more graphs to graphically illustrate the results of that analysis. Additionally, the control program 28 stored in memory circuitry 26 configures the processing circuitry 22 to display the generated graphical representations in one or both of the first and second graph sections 80, 100 of GUI 60, as previously described. Memory circuitry 26 may also store one or more files that are used by the processing circuit 22 during the analysis of the data in the recovery logs. These files may or may not be temporary, and may be created and maintained as needed or desired.

The user I/O interface 30 comprises the components necessary for a user to interact with control computer 20. Such components include, but are not limited to, a display device 32 that displays GUI 60 and the graphs generated by processing circuitry 22, as previously described, a keyboard 34, a mouse 36, any other input mechanisms that facilitate the user's ability to interact with the GUI 60 according to embodiments of the present disclosure. For example, the user may define filter information, select particular events to be represented graphically by the graphs, identify a particular timeframe for the analysis, alter the timeframe for the analysis, and select desired points and/or line segments on the generated graphs displayed in the first and second graph sections 80, 100 to obtain more detailed information about the selected point or line segment, as previously described.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:
1. A computer-implemented method comprising:
retrieving a database recovery log comprising a plurality of transaction entries from a memory circuit, wherein each transaction entry is associated with a Unit of Recovery (UR) and comprises information used in database recovery operations;

generating, from the plurality of transaction entries, a first graphical representation of a plurality of URs, wherein each UR corresponds to a set of related database commands and is graphically represented by a line segment, and wherein at least a user-selected one of the line segments is visually linked to a graphical representation of its corresponding set of related database commands;

generating, from the plurality of transaction entries, a corresponding second graphical representation of the plurality of URs, wherein the second graphical representation comprises a line graph and graphically indicates a user-selected statistical attribute of the first graphical representation, wherein the statistical attribute indicates a number of database commits performed for the plurality of URs of the first graphical representation;

time-aligning the first and second graphical representations; and outputting the time-aligned first and second graphical representations of the plurality of URs to respective first and second graph sections of a Graphical User Interface (GUI) displayed on a display device, wherein at least a portion of the first and second graphical representations display information corresponding to a database error indicated by the database recovery log.

2. The computer-implemented method of claim 1 wherein generating, from the plurality of transaction entries, a first graphical representation of a plurality of URs comprises:
receiving filter information from a user at a filter section of the GUI; and
classifying each of the plurality of URs set into corresponding groups of URs based on the filter information.

3. The computer-implemented method of claim 2 wherein classifying each of the plurality of URs into corresponding groups of URs based on the filter information comprises:
comparing an attribute of a database command associated with a given UR to the filter information received at the filter section of the GUI; and
assigning the given UR to a corresponding group of URs based on whether the attribute matches the filter information.

4. The computer-implemented method of claim 3 wherein each UR in a given group of URs is associated with a database command that is associated with a first attribute.

5. The computer-implemented method of claim 2 wherein outputting the first graphical representation of the plurality of URs to the first graph section of a GUI comprises outputting each group of URs to the first graph section of the GUI.

6. The computer-implemented method of claim 1 wherein each UR comprises a start timestamp and an end timestamp defining a time duration over which the set of related database commands corresponding to the UR were executed.

7. The computer-implemented method of claim 1 further comprising:
receiving a user command selecting a given UR displayed in the first graph section of the GUI; and
outputting the set of related database commands that are linked to the given UR to the display device responsive to the user command.

8. The computer-implemented method of claim 1 further comprising:
generating a graphical indicator representing a predetermined event selected by a user; and
overlaying the graphical indicator on the URs displayed in the first graph section of the GUI, wherein the graphical indicator visually indicates an occurrence of the predetermined event relative to the URs.

9. The computer-implemented method of claim 1 wherein generating the corresponding second graphical representation of the plurality of URs comprises:
receiving a user command at the GUI selecting the statistical attribute, wherein the statistical attribute represents a characteristic of the set of related database commands associated with the URs displayed in the first graph section; and
generating a corresponding line graph for each group of URs displayed in the first graph section, wherein each line graph graphically represents the user-selected statistical attribute.

10. The computer-implemented method of claim 9 wherein the statistical attribute represents one of:
a number of URs in a given group of the plurality of URs;
a number of database rollbacks performed with respect to the URs in the given group of the plurality of URs; and
a computed processing cost associated with executing the set of related database commands for the given group of the plurality of URs.

11. A computing device comprising:
a display device configured to display a Graphical User Interface (GUI) to a user; and a processing circuit configured to:
retrieve a database recovery log comprising a plurality of transaction entries from a memory circuit, wherein each transaction entry is associated with a Unit of Recovery (UR) and comprises information used in database recovery operations;
generate, from the plurality of transaction entries, a first graphical representation of a plurality of URs, wherein each UR corresponds to a set of related database commands and is graphically represented by a line segment, and wherein at least a user-selected one of the line segments is visually linked to a graphical representation of its corresponding set of related database commands;
generate, from the plurality of transaction entries, a corresponding second graphical representation of the plurality of URs, wherein the second graphical representation comprises a line graph and graphically indicates a user-selected statistical attribute of the first graphical representation, wherein the statistical attribute indicates a number of database commits performed for the plurality of URs of the first graphical representation;
time-align the first and second graphical representations; and
output the time-aligned first and second graphical representations of the plurality of URs to respective first and second graph sections of the GUI displayed on the display device, wherein at least a portion of the first and second graphical representations display information corresponding to a database error indicated by the database recovery log.

12. The computing device of claim 11 wherein the processing circuit is further configured to:
receive filter information from a user at a filter section of the GUI; and
classify each of the plurality of URs into corresponding groups of URs based on the filter information.

13. The computing device of claim 12 wherein the processing circuit is further configured to:

compare an attribute of a database command associated with a given UR to the filter information received at the filter section of the GUI; and assign the given UR to a corresponding group of URs based on whether the attribute matches the filter information.

14. The computing device of claim 13 wherein each UR in a given group of URs is associated with a first attribute.

15. The computing device of claim 12 wherein the processing circuit is further configured to output each group of URs to the first graph section of the GUI.

16. The computing device of claim 11 wherein each UR comprises a start timestamp and an end timestamp defining a time duration over which the set of related database commands corresponding to the UR were executed.

17. The computing device of claim 11 wherein the processing circuit is further configured to:

receive a user command selecting a given UR displayed in the first graph section of the GUI; and output the set of related database commands that are linked to the given UR to the display device responsive to the user command.

18. The computing device of claim 11 wherein the processing circuit is further configured to:

generate a graphical indicator representing a predetermined event selected by a user; and overlay the graphical indicator on the URs displayed in the first graph section of the GUI, wherein the graphical indicator visually indicates an occurrence of the predetermined event relative to the URs.

19. The computing device of claim 12 wherein the processing circuit is further configured to:

receive a user command at the GUI selecting the statistical attribute, wherein the statistical attribute represents a characteristic of the set of related database commands associated with the URs displayed in the first graph section; and generate a corresponding line graph for each group of URs displayed in the first graph section, wherein each line graph graphically represents the statistical attribute selected by the user.

20. A computer-readable storage medium comprising computer program code stored thereon that, when executed by a processing circuit of a computing device, configures the processing circuit to:

retrieve a database recovery log comprising a plurality of transaction entries from a memory circuit, wherein each transaction entry is associated with a Unit of Recovery (UR) and comprises information used in database recovery operations;

generate, from the plurality of transaction entries, a first graphical representation of a plurality of URs, wherein each UR corresponds to a set of related database commands and is graphically represented by a line segment, and wherein at least a user-selected one of the line segments is visually linked to a graphical representation of its corresponding set of related database commands;

generate, from the plurality of transaction entries, a corresponding second graphical representation of the plurality of URs, wherein the second graphical representation comprises a line graph and graphically indicates a user-selected statistical attribute of the first graphical representation, wherein the statistical attribute indicates a number of database commits performed for the plurality of URs of the first graphical representation;

time-align the first and second graphical representations; and output the time-aligned first and second graphical representations of the plurality of URs to respective first and second graph sections of a Graphical User Interface (GUI) displayed on a display device, wherein at least a portion of the first and second graphical representations display information corresponding to a database error indicated by the database recovery log.

* * * * *